United States Patent Office 3,547,965
Patented Dec. 15, 1970

3,547,965
PROCESS FOR PREPARING TRIALKYLTIN HALIDES
Tadashi Takubo and Isao Hachiya, both of 3761 Sunada, Kuriyama, Amagasaki-shi, Japan
No Drawing. Continuation-in-part of application Ser. No. 688,707, Dec. 7, 1967. This application Dec. 11, 1967, Ser. No. 689,329
Claims priority, application Japan, Dec. 7, 1966, 41/79,824
Int. Cl. C07f 7/22
U.S. Cl. 260—429.7
14 Claims

ABSTRACT OF THE DISCLOSURE

According to certain of its aspects, the novel process of this invention for manufacturing trialkyltin halide $R_3SnX$ comprises reacting tin with alkyl halide RX, wherein R is alkyl and X is halogen, in the presence of zinc and catalytic amount of alcohol. These trialkyltin halides are useful as bactericides, fungicides, insecticides, antiseptics, agricultural chemicals and antifouling paints.

---

This application is a continuation-in-part of application Ser. No. 688,707, filed Dec. 7, 1967, and now abandoned.

This invention relates to a new process for manufacturing trialkyltin halide.

Trialkyltin compounds have heretofore been used as bactericides, fungicides, insecticides, antiseptics, agricultural chemicals, antifouling paints, etc. The direct synthesis of alkyltin halide directly from metallic tin and alkyl halide is known, but the main product of this method is a dialkyltin dihalide; and the trialkyltin halide is obtained only in small quantity. It is difficult to manufacture trialkyltin halide in large quantity by the direct method. The synthesis of trialkyltin halide by the reaction of stannic chloride with tetra-alkyltin (obtained by the reaction of stannic chloride with alkyl magnesium halide Grignard reagent) is also well known, but it may not be satisfactory as it requires two steps: the Grignard reaction and disproportionation reaction.

According to certain of its aspects, the novel process of this invention for the manufacture of trialkyltin halide $R_3SnX$ comprises reacting metallic tin with alkyl halide RX, wherein R is alkyl and X is halogen, in the presence of zinc and catalytic amount of alcohol.

By practice of the novel method, trialkyltin halide may be synthesized according to the following equation:

$$3RX + Sn + Zn \rightarrow R_3SnX + ZnX_2 \quad (I)$$

In the compound RX, R may be an alkyl group, including cycloalkyl groups. When R is an alkyl group, it may typically be methyl, ethyl, propyl, butyl, amyl, octyl, etc. When R is a cycloalkyl group, it may preferably be cyclohexyl. X may be an active halogen atom, typically chlorine, bromine, and iodine.

It is a particular feature of this invention that when X is chlorine or iodine, the process of this invention may be carried out at atmospheric pressure, provided that R is a higher alkyl or cycloalkyl group. When X is iodine and RX is RI, the reaction may proceed with great facility. Preferably the compound RX may be butyl iodide, amyl iodide, octyl chloride, or butyl chloride. It may be possible to use RX compounds having different R groups or different X groups; but if this be done, it is difficult to separate each product-component of the reaction mixture.

The tin reactant may be present in amount stoichiometrically equivalent to the compound RX; i.e. one gram atom of tin for each three moles of compound RX in accordance with Equation I supra. The tin reactant may be used in any form including powder, foil, ribbon, granule, etc. Preferably, the tin may be present as powder or foil.

The zinc reactant may be present in amount stoichiometrically equivalent to the compound RX; i.e. one gram atom of zinc for each three moles of compound RX in accordance with Equation I supra. The zinc reactant may be used in any form including powder, foil, ribbon, granule, etc. Preferably, the zinc may be present as powder or foil.

The alcohol which may be used as catalyst in practice of this invention may be a monohydroxy alcohol or a polyhydroxy alcohol, e.g. a glycol. The alcohol may be a primary alcohol, a secondary alcohol, or a tertiary alcohol. Ether-alcohols may be employed. Typical examples of preferred alcohols which may be used as catalyst in the process of this invention are primary alcohols such as methyl, ethyl, butyl and octyl alcohol, 2-methoxy and 2-butoxy ethanol; secondary alcohols such as iso-propyl, secondary butyl, and cyclohexyl alcohol; tertiary alcohols such as tertiary butyl alcohol; and polyhydric alcohols such as ethylene glycol, propylene glycol, glycerine, and pentaerythritol. The added quantity of each alcohol is a catalytic amount, i.e. a small but effective amount, e.g. 0.01–1 mole per gram atom of tin.

In carrying out the process of this invention, tin is reacted with alkyl halide in the presence of zinc and catalytic amount of alcohol. Preferably the reactants may be placed in a reaction vessel and heated to reflux temperature, which varies depending upon the reactants, but typically is 110° C.–200° C. The reaction mixture may be maintained at reflux for typically 6–8 hours at which time reaction may be complete. On cooling, an excess of acid, preferably hydrochloric acid, may be added to dissolve unreacted zinc and inorganic substances such as e.g. zinc iodide. Unreacted tin metal may be recovered as by filtration. Distillation may yield as fore-run unreacted RX followed by product $R_3SnX$. This may be further reacted, if desired, with alkaline solution, e.g. aqueous sodium hydroxide, to give high yield of desired bis(trialkyltin) oxide with minimal or reduced amounts of by-product dialkyltin oxide.

Almost all alkyltin halides obtained by the method of this invention are trialkyltin halides. The halide can be hydrolyzed to high purity bis(trialkyltin) oxides. Trialkyltin halide compounds obtained by the method of this invention may be used for various purposes in the form of bis(trialkyltin) oxide or trialkyltin derivatives further synthesized from these compounds.

EXAMPLE 1

59.5 g. of tin powder, 39.0 g. of zinc powder, 258 g. of butyl iodide and 10 g. of n-butanol may be placed in a three-necked reaction vessel equipped with a reflux condenser, stirrer and thermometer, and the mixture stirred at 110° C.–140° C. for 6 hours. After the reaction is completed, it may be cooled and 400 ml. of 20% hydrochloric acid added to dissolve unreacted zinc and inorganic substances such as $ZnI_2$, etc. 4.5 g. of unreacted tin may then be recovered by filtering the solution. After the recovery of unreacted butyl iodide from the organic layer of the filtrate, 164 g. of tributyltin iodide may be obtained. The tributyltin iodide may be treated with alkaline solution and 3.5 g. (2.8%) of dibutyltin oxide and 114 g. (76.5% in yield) of bis(tributyltin) oxide may result. The bis(tributyltin) oxide contained 1.4% of tetrabutyltin and the purity may be over 98%.

EXAMPLE 2

59.5 g. of tin powder, 39.0 g. of zinc powder, 277 g. of amyl iodide and 6.2 g. of ethylene glycol may be placed in a reaction vessel as in Example 1, and the mixture heated and agitated at 135° C.–145° C. for 6 hours. The same procedure as in Example 1 may be followed, and 8.7 g. of unreacted tin and 179 g. of triamyltin iodide recovered. The triamyltin iodide may be treated with alkaline solution and 4.3 g. (3.1%) of diamyltin oxide and 125 g. (73% in yield) of bis(triamyltin) oxide obtained. The bis(triamyltin) oxide contained 2.1% of tetra-amyltin and the purity may be over 97%.

EXAMPLE 3

59.5 g. of tin foil, 39.0 g. of zinc powder, 210 g. of octyl chloride and 10.0 g. of 2-butoxyethanol may be heated and agitated at 160° C.–180° C. for 8 hours in a reaction vessel as in Example 1. After treatment with hydrochloric acid as set forth in Example 1, the organotin layer may be distilled under reduced pressure and 147 g. of distillate at 193° C.–198° C./0.1 mm. Hg recovered. The distillate was trioctyltin chloride and the yield may be 59.5%.

EXAMPLE 4

59.4 g. of tin powder, 39.0 g. of zinc powder, 258 g. of butyl iodide and 7.6 g. of 2-methoxyethanol may be agitated at 110° C.–140° C. for 6 hours in a reaction vessel as in Example 1. After treatment with hydrochloric acid as set forth in Example 1, 4.0 g. of unreacted tin and 171 g. of tributyltin iodide may be recovered. Further treatment, as in Example 1, including treatment with alkaline solution may yield 4.6 g. (3.7%) of dibutyltin oxide and 116 g. (78.0% in yield) of bis(tributyltin) oxide from the tributyltin iodide. The bis(tributyltin) oxide contained 2.4% of tetrabutyltin and the purity may be over 97%.

Although this invention has been described with reference to specific examples, it will be apparent to those skilled-in-the-art that various modifications may be made thereto which fall within the scope of this invention.

We claim:

1. The process for preparing a compound of the formula $R_3SnX$ wherein R is alkyl and X is halogen which comprises reacting an alkyl halide RX with an amount of metallic tin stoichiometrically equivalent to the amount of the compound RX in the presence of an amount of zinc stoichiometrically equivalent to the compound RX and catalytic amount of alcohol.
2. The process of claim 1 wherein R is butyl.
3. The process of claim 1 wherein R is octyl.
4. The process of claim 1 wherein RX is butyl iodide.
5. The process of claim 1 wherein said alcohol is a primary alcohol.
6. The process of claim 1 wherein said alcohol is butanol.
7. The process of claim 1 wherein said alcohol is a secondary alcohol.
8. The process of claim 1 wherein said alcohol is a tertiary alcohol.
9. The process of claim 1 wherein said alcohol is a glycol.
10. The process of claim 1 wherein said alcohol is ethylene glycol.
11. The process of claim 1 wherein said alcohol is an ether alcohol.
12. The process of claim 1 wherein said alcohol is butoxy ethanol.
13. The process of claim 1 wherein said process is carried out at reflux temperature.
14. The process of claim 1 wherein said alcohol is present in amount of 0.01–1 mole per one gram atom of tin.

References Cited

UNITED STATES PATENTS

| 3,085,102 | 4/1963 | Yatagai et al. | 260—429.7 |
| 3,340,283 | 9/1967 | Gloskey | 260—429.7 |
| 3,387,011 | 6/1968 | Coates et al. | 260—429.7 |
| 3,297,732 | 1/1967 | Banks | 260—429.7 |
| 3,387,012 | 6/1968 | Jasching et al. | 260—429.7 |
| 3,404,167 | 10/1968 | Gray et al. | 260—429.7 |
| 3,415,857 | 12/1968 | Hoye | 260—429.7 |
| 3,426,087 | 2/1969 | Ashby | 260—429.7 X |
| 3,400,141 | 9/1968 | Hoye et al. | 260—429.7 |
| 3,287,386 | 11/1966 | Neuman et al. | 260—429.7 |

TOBIAS E. LEVOW, Primary Examiner

W. F. W. BELLAMY, Assistant Examiner